United States Patent Office 3,296,207
Patented Jan. 3, 1967

3,296,207
PROCESS FOR THE PRODUCTION OF POLYFORMALS OF β-HYDROXYALKYL-ISOCYANURATES AND PRODUCTS THEREOF
Richard W. Cummins, Rahway, N.J., assignor to FMC Corporation, New York, N.Y., a corporation of Delaware
No Drawing. Filed Dec. 29, 1961, Ser. No. 163,043
5 Claims. (Cl. 260—67.5)

This invention relates to the production of a new class of polyformals made by the polymerization of bis and tris (β-hydroxyalkyl) isocyanurates and more particularly to the application of these polyformals on cellulose and regenerated cellulose textiles.

Most textile fabrics, especially cotton and viscose rayon (regenerated cellulose) have poor resilience and are thus easily creased or wrinkled when crushed or subjected to a localized pressure in a folded condition. In order to overcome these shortcomings, it has been the practice to form insoluble resinous compounds in situ within the fabric fibers. Commonly employed resins are the urea- or melamine- formaldehyde resins. Resins of this type have not been found completely suitable because the results obtained have not been found reproducible. Further, many of these resins have deleterious side effects; for example, some of these materials cause permanent discoloration of the fabric being treated. Others cause discoloration and charring. Others have poor washability and consequently lose the added resin after a few washings.

It is an object of the present invention to impart high crease resistance to textiles such as cotton and viscose rayon by means of a new class of polymeric compounds which produces crease resistant finishes on cellulosic textiles which are resistant to repeated launderings, and do not discolor the textiles.

This and other objects will become readily apparent from the following disclosure.

It has now been found that bis and tris (β-hydroxyalkyl) isocyanurates, in which the alkyl group contains 2 to 3 carbon atoms, react with formaldehyde in the presence of an acid catalyst at temperatures within the range of about 50 to 160° C. to form either linear polyformals or cross-linked polyformals. When these polyformals are produced in situ on cellulose fibers, and cured, permanent crease resistance is imparted to the cellulose fiber without discoloration.

The polyformals useful in this application are produced by reacting either a bis or tris (β-hydroxyalkyl) isocyanurate, having an alkyl chain of 2 to 3 carbon atoms, with at least stoichiometric amounts of formaldehyde in the presence of an acid catalyst. The precursor bis or tris (β-hydroxyalkyl) isocyanurates may be produced in the manner described in the co-pending U.S. application, S.N. 101,662, filed April 10, 1961, in the name of the present inventor now abandoned.

In the case of the bis-(β-hydroxyalkyl) isocyanurates, the reaction takes place as follows:

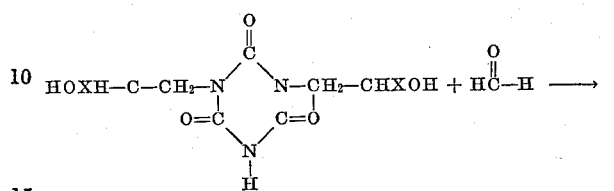

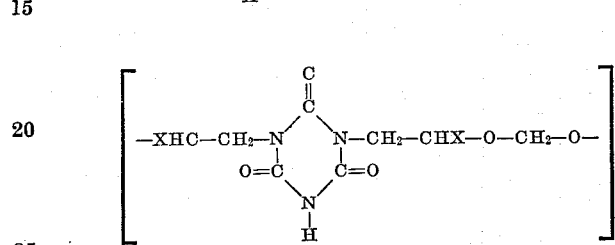

where X=H or CH₃ and n=an integer over 10.

The resultant product is a linear polyformal of a dialkyl isocyanurate.

In the case of the tris-(β-hydroxyalkyl) isocyanurates, the reaction takes place as follows:

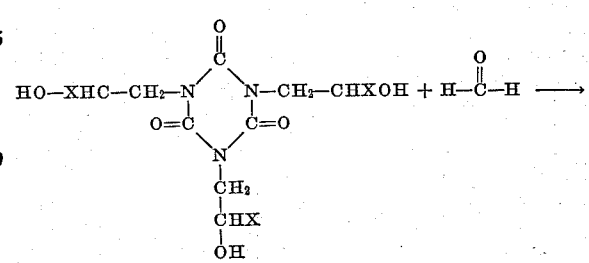

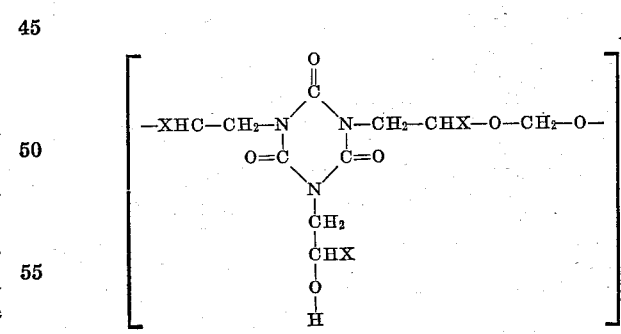

where X=H or CH₃ and n=an integer over 10.

This product is a linear polyformal of a trialkyl isocyanurate.

In addition to the above reaction, the tris-(β-hydroxyalkyl) isocyanurates are capable of crosslinking to form insoluble gels, through chemical reaction of the third hydroxyalkyl chain. This reaction takes place as follows:

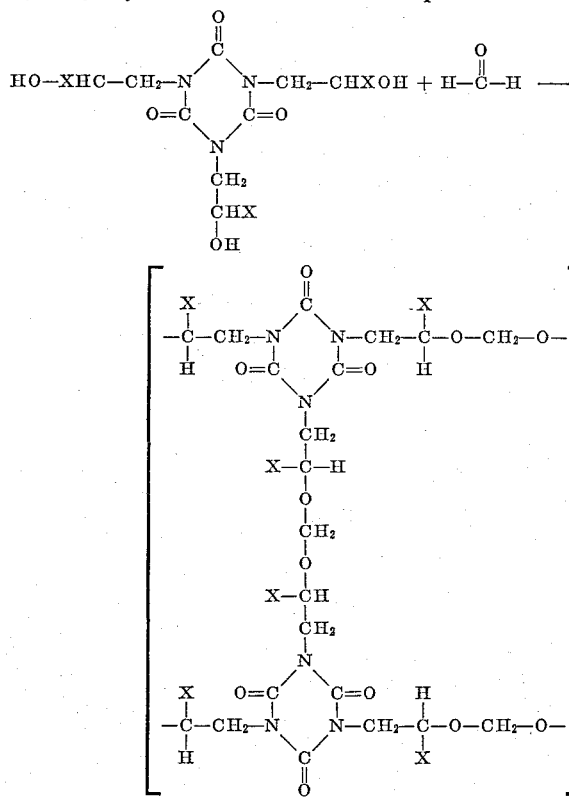

where X=H or CH$_3$ and $n$=an integer over 10.

The resulting product is an insoluble gel. The degree of cross-linking can be varied depending upon the strength of the catalyst, the temperature of reaction, and the time of reaction.

The reaction proceeds best in the presence of an acid catalyst. Any acid catalyst may be employed provided it does not enter into the reaction itself. Amounts of acid on the order of about 0.1 to 0.5 mole percent based on the moles of isocyanurate radical present, have been found effective. When producing the polyformals on fabrics, the catalyst employed should not damage the base fiber which attaches to the polymer. Suitable acid catalysts which can be employed for cellulose and regenerated cellulose application include zinc fluoborate and aluminium perchlorate. Where the polymer per se is being produced for subsequent application, stronger organic and inorganic acids can be employed such as p-toluenesulfonic, perchloric, phosphoric, sulfuric, nitric and chloroacetic acids.

The reaction is carried out by mixing the β-hydroxyalkyl isocyanurate with at least stoichiometric amounts of formaldehyde and heating the mixture at from about 50 to 160° C. in the presence of about 0.1 to 0.5 mole percent of an acid catalyst. A linear thermoplastic polymer is obtained when one mole of the β-hydroxyalkyl substituted isocyanurate reacts with one mole of formaldehyde, this representing the stoichiometric proportions. If less than the stoichiometric amount of formaldehyde is employed, some of the β-hydroxyalkyl isocyanurate remains unreacted. The linear polymers can be produced by reaction of either the di- or tri-substituted β-hydroxyalkyl isocyanurates with formaldehyde. Polymerization takes place by joining two hydroxyalkyl chains together through a formaldehyde molecule. The formaldehyde group forms ether-type linkages with each of the hydroxyalkyl groups.

A cross-linked polymer, i.e., a gel, results when 2 moles of tris-(β-hydroxyalkyl) isocyanurate reacts with 3 moles of formaldehyde, this representing the stoichiometric proportions. If less than stoichiometric amounts of formaldehyde are present, cross-linking and/or linear polymerization would be only partially complete. Gel formation can only take place with the tris-(β-hydroxyalkyl) isocyanurate. Gel formation requires cross-linking of the isocyanurate radicals and this can only take place through a third hydroxyalkyl group on the isocyanurate group. The formation of the gel takes place by joining each of three hydroxyalkyl chains with other hydroxyalkyl groups through formaldehyde molecules. The formaldehyde group joins the hydroxyalkyl chains by forming ether-type linkages with the formation of water. The resulting cross-linked structure is a gel which is insoluble in water and other solvents and which is stable at temperatures up to 350° C.

In either case, excess formaldehyde is desirable because its high volatility at elevated temperatures results in the loss of some reagent unless preventive measures are taken. One method for preventing loss of formaldehyde is by employing a closed reactor under super atmospheric pressure.

The conditions required to produce the polyformals vary depending upon the specific acid catalysts employed, the temperature of reaction, and the length of time during which the reaction is permitted to proceed. For example, tris-(β-hydroxyethyl) isocyanurate and from 0.1 to 0.5 mole percent of a weak acid catalyst such as zinc fluoborate requires only 10 minutes of reaction at 150° C. in order for the polymer to form. When a strong acid catalyst such as perchloric acid is employed at temperatures of 110° C., reaction for only three minutes is sufficient to produce the polyformal. In general, temperatures lower than 50° C. are not desirable since extended periods of reaction must be employed to obtain polymerization. Temperatures in excess of about 160° C. can be employed, but are not desirable because of the difficulty of maintaining the volatile formaldehyde in the reaction vessel.

The following examples are presented by way of illustration only and are not deemed to be limiting to the present invention.

*Example I*

The following procedure was employed for producing (tris-(β-hydroxyethyl) isocyanurate.

A charge of 26.1 g. (0.202 mole) of cyanuric acid and 27.54 g. (0.626 mole) of ethylene oxide was mixed with 96.6 g. (1.35 moles) of dimethyl formamide and heated with stirring in a closed glass vessel at 100° C. for 4.9 hours under autogenous pressure. The ethylene oxide was added in 3 separate portions in order to reach 100° C. without exceeding 1 atmosphere gage. During the reaction, the pressure in the vessel decreased from 790 mm. to 30 mm. Hg and the pH of the mixture increased from 7 to 9. The resulting clear solution was neutralized to pH 7 with 1 N sulfuric acid and distilled under 2 mm. Hg at 100° C. to remove the dimethyl formamide. A white solid having a melting point of 95 to 131° C., and weighing 54.9 g. was recovered. It was identified as a mixture of 3.6% bis-(β-hydroxyethyl) isocyanurate and 96% tris-(β - hydroxyethyl) isocyanurate. The recovery was 104.8% of theory based on the cyanuric acid reagent consumed for a 3.6% bis and 96.4% tris mixture.

The other hydroxyalkyl isocyanurates are made in similar fashion by proper choice of raw materials and proportions of reactants.

*Example II*

A mixture in the ratio of one mole of tris-(β-hydroxyethyl) isocyanurate to three moles of 37% aqueous formaldehyde solution (containing 14% methyl alcohol) was charged into a flask and heated to about 50 to 60° C. for 15 minutes to insure complete solution. At the termination of the heating period, the solution containing the mixture was diluted with water to yield at 14% solution and Zn(BF$_4$)$_2$ was added to the solution as a catalyst. A cotton print cloth 80 by 80 threads per inch, weighing about 3.4 yds./lb., was immersed in this solution and the excess solution was squeezed out until the cloth had about 70 to 80% wet pick up. The cloth was passed into a drying oven and heated at about 80 to 100° C. for 4 minutes to dry the cloth. Thereafter, the cloth was passed into a curing oven and reacted at from 110° C. to 165° C. for between 4 and 8 minutes. The crease resistance of the treated cloth, as well as control samples of the same cloth, were determined by ASTM method D–1295–53T. This test is designed to test the recovery of a cloth sample which has been creased in a designated manner. Values of above about 115° are considered acceptable. A series of tests was run, as described above, using various treating agents and conditions. The agents, conditions and test results are tabulated in Table I.

mass was obtained. The remainder of the syrup solidified on cooling into a hard, water-insoluble clear mass. This was identified as the linear polyformal of bis-($\beta$-hydroxyethyl) isocyanurate.

Example VII

Tris-($\beta$-hydroxypropyl) isocyanurate (2.0 g., .007 mole) containing 6.9% bis-($\beta$-hydroxypropyl) isocyanurate was mixed with 1.0 gram of 91% paraformaldehyde (.030 mole) and 5 drops of 40% aqueous zinc fluoborate. The mixture was heated in an oil bath maintained at 150° C. The mixture melted into a clear liquid which evolved water after about five minutes of heating. A por-

TABLE I

| Treating Agent | Solution Strength, Percent | Catalyst | Amount of Catalyst, Weight Percent | Drying Temp., °C. | Reaction Temp., °C. | Warp Resistance, ° |
|---|---|---|---|---|---|---|
| None (Control) | | | | | | 54 |
| THEC·HCHO[1] | 10 | Zn (BF$_4$)$_2$ | 8.6 | 100 | 155 | 122 |
| THEC·HCHO | 14 | Zn (BF$_4$)$_2$ | 8.6 | 85 | 135 | 124 |
| THEC·HCHO | 14 | Zn (BF$_4$)$_2$ | 14.0 | 87 | 135 | 120 |
| THEC·HCHO | 10 | Zn (BF$_4$)$_2$ | 8.6 | 87 | 134 | 125 |
| Tested after 10 washings 120° | | | | | | |
| BHEC·HCHO[2] | 10 | Zn (BF$_4$)$_2$ | 8.6 | 100 | 160 | 117 |
| THPC·HCHO[3] | 14 | Zn (BF$_4$)$_2$ | 12.25 | 90 | 135 | 118 |
| THEC·HCHO | 14 | Al (ClO$_4$)$_3$ | 4.0 | 82 | 110 | 130 |

[1] THEC·HCHO=tris-($\beta$-hydroxyethyl) isocyanurate plus formaldehyde.
[2] BHEC·HCHO=bis-($\beta$-hydroxyethyl) isocyanurate plus formaldehyde.
[3] THPC·HCHO=tris-($\beta$-hydroxypropyl) isocyanurate plus formaldehyde.

Example III

Tris-($\beta$-hydroxyethyl) isocyanurate (2.0 g., 0.0077 mole) and 1.0 gram of 91% aqueous paraformaldehyde (.030 mole) and 5 drops of 40% aqueous zinc fluoborate were added in a test tube in an oil bath maintained at 150° C. for 10 minutes. A clear liquid was obtained which polymerized to a gel. The gel when heated on a Kofler hot stage in air showed no visible change except the development of a medium amber color near 350° C. The polyformal was found suitable as a heat resistant molding compound.

Example IV

Tris-($\beta$-hydroxyethyl) isocyanurate (2.0 g., 0.0077 mole) and 1.0 gram of 91% paraformaldehyde (.030 mole) and 0.02 grams (.0001 mole) of p-toluenesulfonic acid were heated in a test tube in an oil bath maintained at 110° C. Gel formation commenced after 2 minutes of heating. After 10 minutes of heating, the tube contained a sponge-like water-insoluble polymer.

Example V

Tris-($\beta$-hydroxyethyl) isocyanurate (28.1 g., .108 mole), 28.2 ml. of 37% aqueous formaldehyde (.385 mole), 2.1 ml. of 35% aqueous perchloric acid, and 143 ml. of water were mixed and filtered to give a clear solution having a pH of 1.2. The solution underwent no visible change on storage at 30° C. for 68 hours. Removal of the water by heating at 50° C. and 30–35 mm. Hg gave a water-insoluble syrup. A portion of the syrup was drawn into filaments indicating linear polymerization. Further heating of the remaining syrup at 110° C. for 30 minutes resulted in gel formation.

Example VI

Bis-($\beta$-hydroxyethyl) isocyanurate (2.0 g., .009 mole) was dissolved in 5 ml. of 37% aqueous formaldehyde (.068 mole) and 3 drops of 40% of aqueous zinc fluoborate was added. The solution was heated in an oil bath maintained at 150° C. for 30 minutes and yielded a viscous syrup. An initial portion of the syrup was drawn into long filaments. A second portion of the syrup was dissolved in dimethylformamide and coated on a metal surface. Upon drying, a uniform film of a clear, hard tion of the viscous clear liquid was drawn into filaments indicating linear polymerization. The remainder of the mixture gelled when heated for a total of 10 minutes in the oil bath. This water-insoluble gel, atfer water washing and drying, was more pliable than polyformal gels made from tris-($\beta$-hydroxyethyl) isocyanaurates.

Pursuant to the requirements of the patent statutes, the principal of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A water-insoluble thermoplastic linear polymer composition which consists essentially of the reaction product of a compound selected from the group consisting of bis-($\beta$-hydroxyalkyl) isocyanurates and tris-($\beta$-hydroxyalkyl) isocyanurates in which the alkyl radical of each member of the group contains from two to three carbon atoms and formaldehyde, said reaction product being formed at from about 50–160° C., said compound selected from said group being present in the ratio of about one mole per mole of said formaldehyde.

2. A water-insoluble thermosetting gel composition which consists essentially of the reaction product of tris-($\beta$-hydroxyalkyl) isocyanurates in which the alkyl radical contains from two to three carbon atoms and formaldehyde, said reaction product being formed at from about 50–160° C. and in which said tris-($\beta$-hydroxyalkyl) isocyanurates are present in the ratio of about two moles to about three moles of said formaldehyde.

3. A method for producing crease resistance in fibrous compounds selected from the group consisting of cellulose and regenerated cellulose which comprises wetting said compounds with a mixture of (a) A compound selected from the group consisting of bis-($\beta$-hydroxyalkyl) isocyanurates and tris-($\beta$-hydroxyalkyl) isocyanurates in which the alkyl radical of each member of the group contains from two to three carbon atoms and (b) Formaldehyde in at least about stoichiometric amounts and heating said mixture of (a) and (b) to temperatures within the range of about 50 to 160° C. in the presence of an acid catalyst that does not damage such fibrous compounds to form a water insoluble polymeric composition in situ which adds crease-resistance to said fibrous compound.

4. Process of claim 3 in which said compound and said formaldehyde are present in a mole to mole ratio.

5. Process of claim 3 in which said compound is a tris-($\beta$-hydroxyalkyl) isocyanurate in which the alkyl radical contains from two to three carbon atoms and said compound is present in the ratio of two moles to every three moles of said formaldehyde.

References Cited by the Examiner

UNITED STATES PATENTS

| | | | |
|---|---|---|---|
| 2,884,407 | 4/1959 | Keim | 260—675 |
| 3,088,948 | 5/1963 | Little et al. | 260—248 |
| 3,058,849 | 10/1962 | Bakke et al. | 117—139.4 |
| 3,116,967 | 1/1964 | Goldstein et al. | 8—115.6 |

FOREIGN PATENTS

| | | |
|---|---|---|
| 613,629 | 5/1935 | Germany. |
| 420,525 | 11/1934 | Great Britain. |

OTHER REFERENCES

Sayligh et al., J. Chem. Society, July 1961, pages 3184–9.

Frazer et al., J. Org. Chem., volume 25 (November 1960), pages 1944–6.

WILLIAM H. SHORT, *Primary Examiner.*

PHILIP E. MANGAN, A. D. RICCI, H. E. SCHAIN, *Assistant Examiners.*